JOURNAL BOX CONSTRUCTION FOR RAILWAY CARS

Original Filed April 25, 1958 4 Sheets-Sheet 1

INVENTORS:
Theodore J. Sweger,
BY Finn Jensen,
Robert R. Lockwood
Atty

JOURNAL BOX CONSTRUCTION FOR RAILWAY CARS

Original Filed April 25, 1958 4 Sheets-Sheet 2

INVENTORS
Theodore J. Sweger,
BY Finn Jensen,
Robert R. Lockwood
Atty.

JOURNAL BOX CONSTRUCTION FOR RAILWAY CARS

Original Filed April 25, 1958 4 Sheets-Sheet 3

INVENTORS.
Theodore J. Sweger,
BY Flinn Jensen,
Robert R. Lockwood
Attys

JOURNAL BOX CONSTRUCTION FOR RAILWAY CARS

Original Filed April 25, 1958 4 Sheets-Sheet 4

INVENTORS.
Theodore J. Sweger,
BY Finn Jensen,
Robert R. Lockwood
Atty

United States Patent Office

Re. 25,015
Reissued Aug. 1, 1961

25,015
JOURNAL BOX CONSTRUCTION FOR RAILWAY CARS

Theodore J. Sweger and Finn Jensen, Riverdale, Ill., assignors to Illinois Railway Equipment Company, Chicago, Ill., a corporation of Illinois Original No. 2,903,305, dated Sept. 8, 1959, Ser. No. 731,049, Apr. 25, 1958. Application for reissue Feb. 16, 1961, Ser. No. 90,166
15 Claims. (Cl. 308—38)

Matter enclosed in heavy brackets [ ] appears in the original patent but forms no part of this reissue specification; matter printed in italics indicates the additions made by reissue.

This invention relates, generally, to the construction of journal boxes for railway cars and it has particular relation to the application thereto of railway car axles centering means.

Among the objects of this invention are: To provide for centering a railway car axle in a journal box in a new and improved manner; to apply and remove centering means to and from the journal box with the axle journal in the box; to apply the centering means by a movement endwise of the axle journal along the side walls of the journal box; to employ a journal guide of non-ferrous metal anda journal guide housing therefor of ferrous metal; to wedgingly hold each journal guide in operative position by a mortise and tenon construction; to provide a bifurcated portion at the inner end of each journal guide housing for endwise engagement with and under the head of a threaded bolt extending through the respective side wall of the journal box and having a nut on the outside that can be tightened to hold the housing and thereby the journal guide in place; to provide the bifurcated portion as a longitudinal endwise extension of the journal guide housing; to provide the bifurcated portion in offset relation to the longitudinal axis of the journal guide housing on the underside thereof; to provide one or more vertical grooves in the bearing surface of each journal guide; and to provide bridging means for each journal guide housing interfitting with the vertical grooves in the bearing surfaces of the journal guides.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which.

Figure 1:
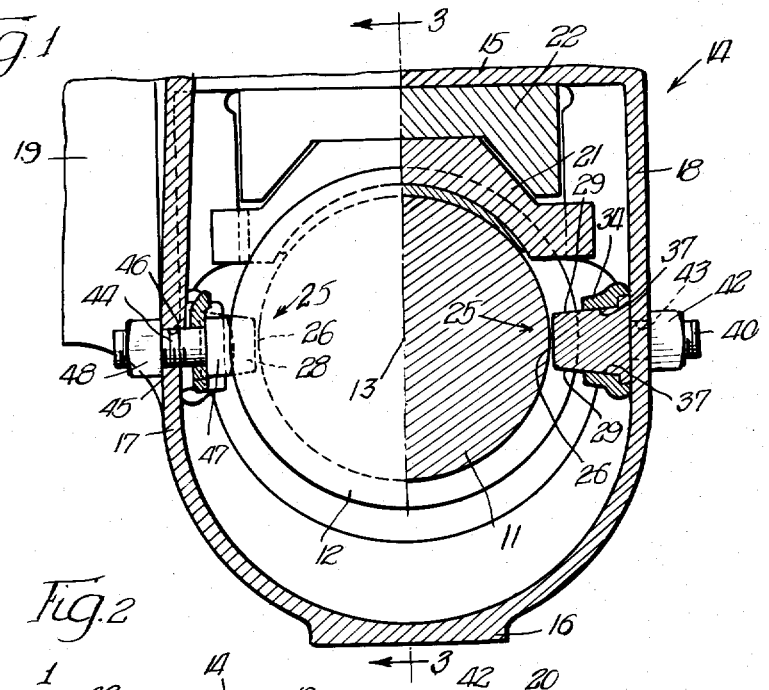
FIGURE 1 is a vertical sectional view, taken generally along the line 1—1 of FIGURE 2, and showing a railway car journal box in which the present invention is embodied.
Figure 2:
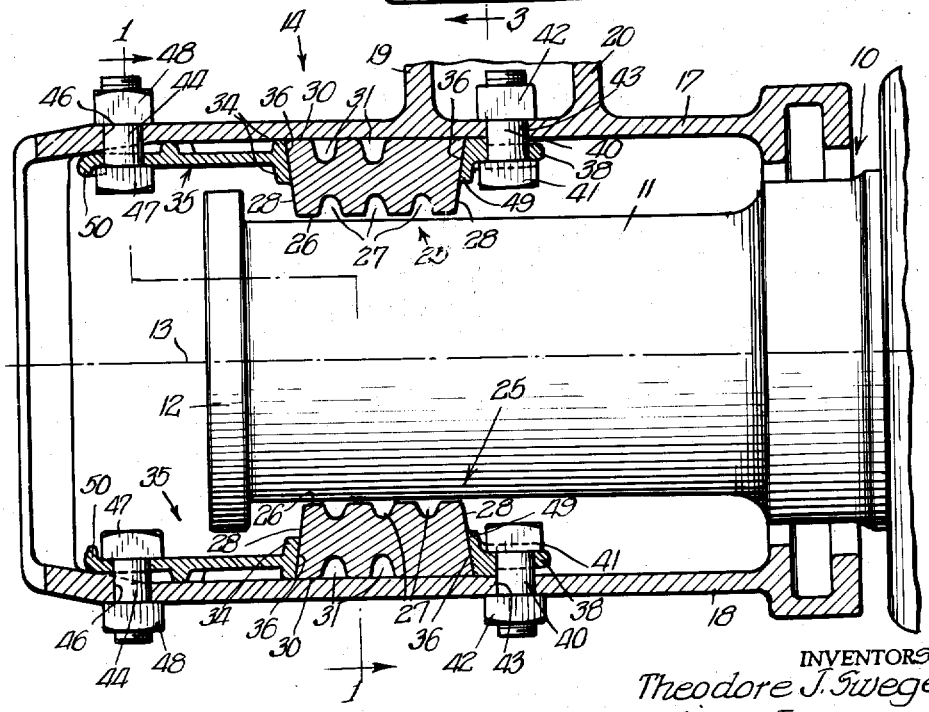
FIGURE 2 is a horizontal sectional view taken generally along the line 2—2 of FIGURE 3.
Figure 3:
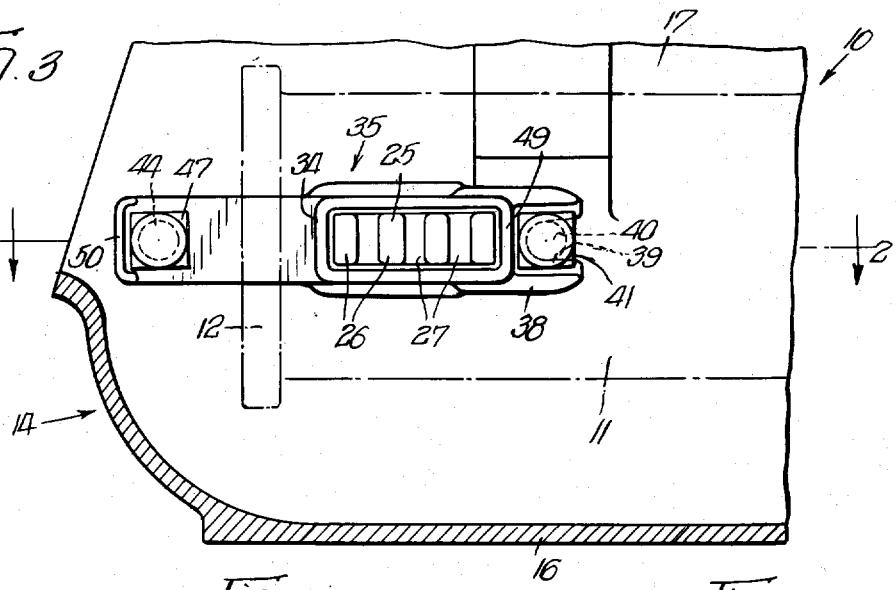
FIGURE 3 is a vertical sectional view taken generally along the line 3—3 of FIGURE 1, the axle journal being shown in broken line outline.

Referring now particularly to FIGURES 1, 2 and 3 of the drawings, it will be observed that the reference character 10 designates, generally, a railway car axle which is provided with an axle journal 11 that has at its outer end an end collar 12 which extends radially beyond the bearing surface of the journal 11. The longitudinal axis of rotation of the axle 10 is indicated at 13. The longitudinal axis 13 is employed as a reference base in defining the invention in certain of the claims.

The axle journal 11 extends into a railway car journal box that is indicated, generally, at 14 and forms an integral part of a side frame of a railway car truck. The journal box 14 includes a top 15, a bottom 16 and vertical side walls 17 and 18. Side frame walls 19 and 20 extend from the vertical side wall 17 toward the journal box at the other end of the truck or side frame as is readily understood. Positioned within the journal box 14 is a journal bearing 21 that rests upon the upper side of the axle journal 11 and is held in position by a wedge 22.

Figure 7:
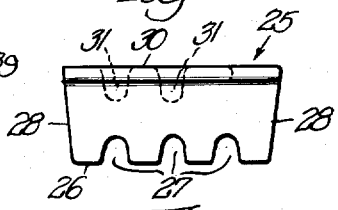
FIGURE 7 is a top plan view of one form of journal guide that can be employed in practicing this invention.
Figure 8:
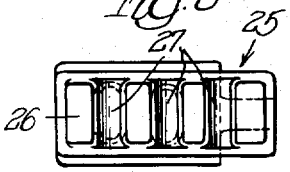
FIGURE 8 is a view, in front elevation, of the journal guide shown in FIGURE 7.
Figure 9:
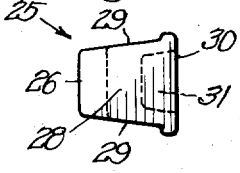
FIGURE 9 is a view, in end elevation, of the journal guide shown in FIGURES 7 and 8.

It is desirable to prevent movement of the axle journal 11 out of the journal bearing 21 which tends to take place during the starting or stopping of a train or at any time when there is a change in its speed. It is to provide for guiding the axle journal 11 within the journal box 14 and centering it substantially in the position shown under the journal bearing 21 that this invention is particularly addressed. For this purpose there is provided on each of the vertical side walls 17 and 18 a journal guide which is indicated, generally, at 25 and the details of construction of which are shown more clearly in FIGURES 7, 8 and 9 of the drawings. Preferably the journal guide 25 is formed of a non-ferrous metal such as a bronze casting. It has a bearing face 26 which is arranged, as shown in FIGURES 1 and 2, to be juxtaposed to diametrically opposite sides of the axle journal 11. When so arranged, the axle journal 11 is confined within the journal box 14 and cannot escape from the journal bearing 21. The bearing face 26 is provided with a plurality of vertical grooves 27 to facilitate the maintaining of a film of lubrication over the surface of the axle journal 11.

In order to secure the journal guide 25 in place it is in the form of an outflaring tenon or it has a wedge shape which is provided by inclined ends 28 and inclined sides 29. The rear surface 30 of each journal guide 25, as shown in FIGURE 2, bears against the inner surface of the respective side wall 17 or 18. The rear surface 30 in each case is provided with vertical grooves 31 for reducing the amount of material required for each journal guide 25.

Figure 4:
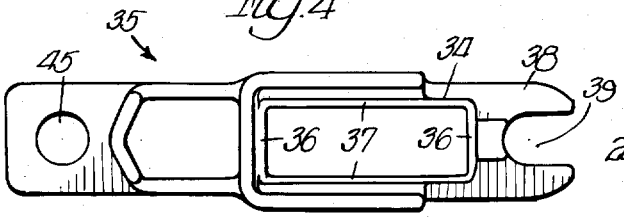
FIGURE 4 is a view, in rear elevation, of one form of journal guide housing that can be employed in practicing this invention.
Figure 5:
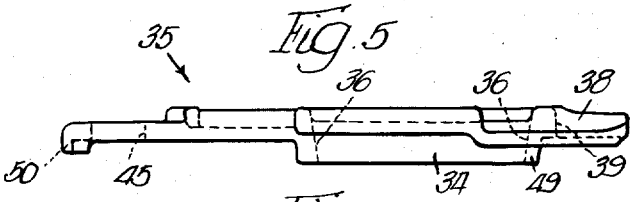
FIGURE 5 is a top plan view of the journal guide housing shown in FIGURE 4.
Figure 6:
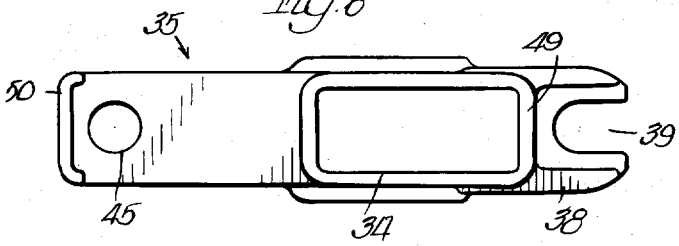
FIGURE 6 is a view, in front elevation, of the journal guide housing showing in FIGURES 4 and 5.

The journal guides 25 are wedgingly held in operative position in a socket 34 in the form of a mortise flaring outwardly toward the respective side wall 17 or 18. The socket 34, as shown in FIGURES 4, 5 and 6, is formed in a journal guide housing, indicated generally at 35, and formed preferably of a malleable iron casting. The socket 34 is provided with inclined end walls 36 and inclined side walls 37 for receiving the correspondingly inclined ends and sides of the journal guide 25.

With a view of permitting endwise application of the journal guide housing 35 assembled with a journal guide 25, the journal guide housing 35 is provided with a bifurcated section 38 as an endwise extension. The bifurcated section 38 has an endwise opening slot 39 for application to a bolt 40 which forms one of a pair of threaded bolts that are located in a horizontal plane through the longitudinal axis 13 of the axle journal 11.

As shown more clearly in FIGURE 2 of the drawings the bolt 40 is provided with a head 41 which overlies the bifurcated section 38 of the journal guide housing 35 while a nut 42 is provided at the other end. The bolt 40 extends through an opening 43 between the side frame walls 19 and 20.

The other bolt of the pair is indicated at 44 and it extends through an aperture 45 at the other end of the journal guide housing 35 and also through a registering opening 46 in the respective side wall 17 or 18. At its inner end the bolt 44 has a head 47 and a nut 48 is threaded on its other end. The heads 41 and 47 of the bolts 40 and 44 preferably are rectangular and flanges 49 and 50 are formed integrally with the journal guide housing 35 adjacent thereto to prevent turning of the respective bolts when the nuts are tightened.

Before applying the journal guide centering means shown in FIGURES 1, 2 and 3 of the drawings, the openings 43 and 46 are formed in the side walls 17 and 18 of the journal box 14. They may be formed by drilling or burning and they are located in a horizontal plane through the axis 13 of rotation of the axle journal 11. In describing the assembly of the journal guide means in the journal box 14 it is assumed that the axle journal 11 is positioned therein, as shown in FIGURE 2, and that the journal bearing 21 and wedge 22 have been removed. Next the bolts 40 are inserted in the openings 43 in the side walls 17 and 18 and the nuts 42 are loosely threaded thereon. The bolts 40 are located in such position that the heads 41 are spaced from the inner surfaces of the side walls 17 and 18.

The assembly now is ready for receiving the journal guides. Accordingly, a journal guide 25 is assembled with a journal guide housing 35 and together they are moved downwardly over the surface of the axle journal 11. For example, as viewed in FIGURE 1, the journal guide housing 35 with the journal guide 25 assembled therein is moved downwardly along the left side of the axle journal 11 with the left end or inclined end 28 adjacent the end collar 12. The spacing is such that the bifurcated section 38 clears the bolt 40. When the journal guide 25 has been properly located, the journal guide housing 35 is moved lengthwise with the bolt 40 interfitting in the slot 39. Next the bolt 44 is inserted and finally the nuts 42 and 48 are tightened. Because of the mortise and tenon arrangement of the journal guide housing 35 and the journal guide 25, the latter is wedgingly held in position against the inner surface of the respective side wall 17 or 18.

When it is desired to remove the journal guide 25 and the associated journal guide housing 35, the nut 42 on the bolt 40 is loosened while the bolt 44 is removed. Then the journal guide housing 35 can be withdrawn endwise toward the front of the journal box 14 and, after the bifurcated section 38 clears the bolt 40, the assembly can be moved upwardly over the surface of the axle journal 11 after removal of the journal bearing 21 and wedge 22 and then withdrawn completely from the journal box 14.

Another embodiment of the invention is illustrated in FIGURES 10 to 19 inclusive and reference thereto now will be had. Insofar as possible the same reference characters will be employed where the same elements are used.

FIGURES 16, 17, 18 and 19 show a modified form of journal guide. It is indicated, generally, at 53 and preferably is of non-ferrous material such as a bronze casting. The journal guide 53 has a bearing face 54 that is arranged to be juxtaposed to the surface of the axle journal 11 at diametrically opposite positions when supported by the vertical side walls 17 and 18 of the journal box 14. Vertical grooves 55 are provided in the bearing face 54 to facilitate maintaining a film of lubrication over the surface of the axle journal 11. The journal guide 53 preferably is in the form of an outflaring tenon or of wedge shape and has inclined ends 56 and inclined sides 57. The rear surface 58 is arranged to bear against the inner surface of the side wall 17 or 18 as the case may be. Grooves 59 are provided in the rear surface 58 to reduce the amount of material employed.

The journal guide 53 is arranged to be positioned in a socket 60 or mortise which flares outwardly toward the respective side walls 17 or 18. The socket 60 is formed in a journal guide housing that is indicated, generally, at 61 and preferably is a malleable iron casting. The journal guide housing 61 is intended for application to the side wall 17 while a journal guide housing, shown generally at 62, of opposite hand construction is intended for application to the other side wall 18. Except for being of opposite hand construction the journal guide housings 61 to 62 are identical and thus the description of one will suffice for both.

On the under side of the journal guide housing 61 at the inner end there is provided a bifurcated section 63 which has a longitudinally extending slot 64 which is arranged to interfit with the bolt 40. Since the bifurcated section 63 is offset from the longitudinal axis of the journal guide housing 61, the apertures 43 in the vertical side walls 17 and 18 are correspondingly offset or located below the horizontal plane through the longitudinal axis 13 of the axle journal 11. At the other end the journal guide housing 61 is provided with an aperture 65 for receiving the other bolt 44. Flanges 66 and 67 are formed integrally with the journal guide housing 61 adjacent the slot 64 and aperture 65 for the purpose of preventing turning of the bolts 40 and 44 by cooperating with the square heads 41 and 47 thereof.

Figure 10:
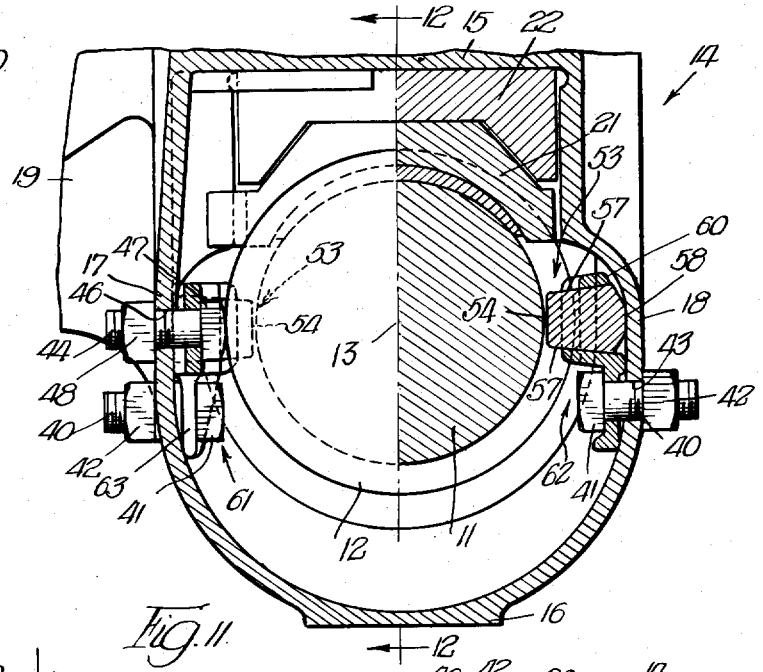
FIGURE 10 is a vertical sectional view, taken generally along the line 10—10 of FIGURE 11 and showing the journal box, also shown in FIGURES 1, 2 and 3 of the drawings, with which another embodiment of the invention is employed.
Figure 11:
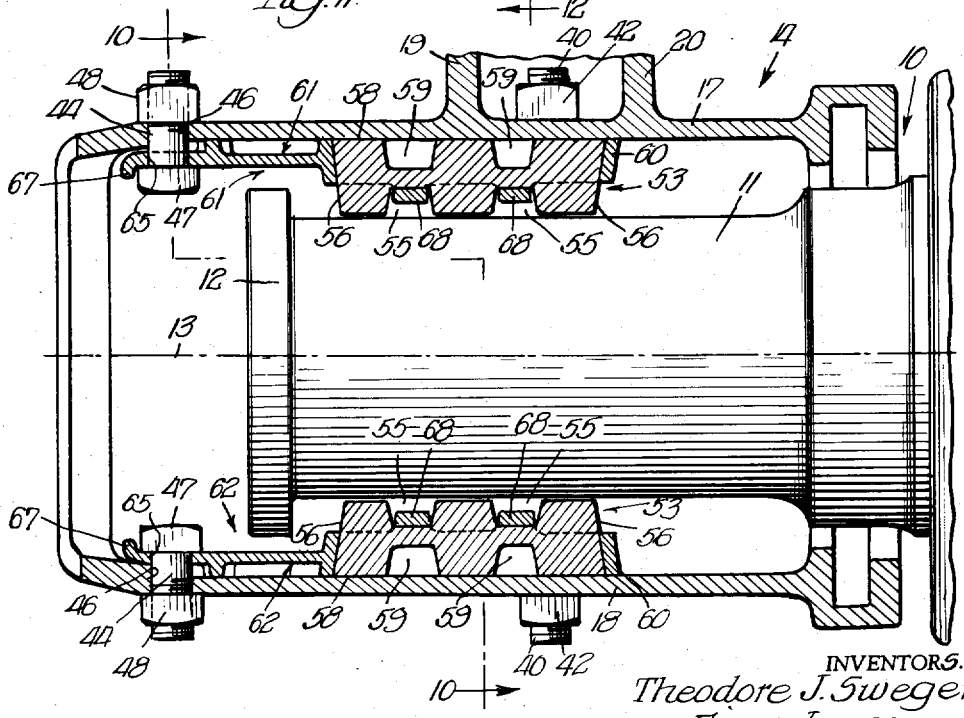
FIGURE 11 is a horizontal sectional view taken generally along the line 11—11 of FIGURE 12.
Figure 12:
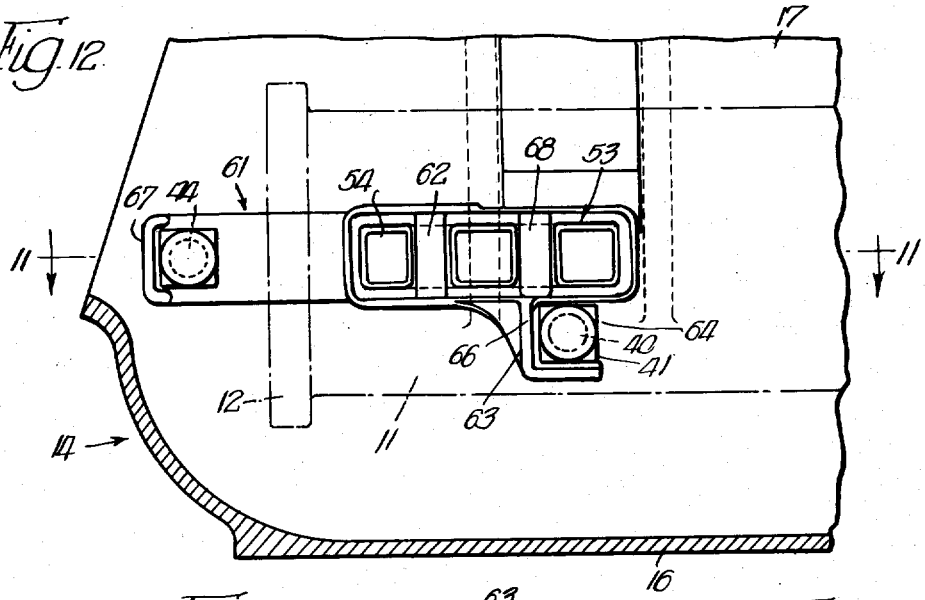
FIGURE 12 is a vertical sectional view taken generally along the line 12—12 of FIGURE 10, the axle journal being shown in broken line outline.
Figure 13:
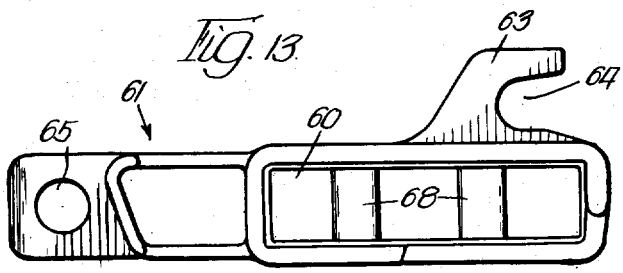
FIGURE 13 is a view, in rear elevation, of a modified form of journal guide housing that can be employed in accordance with this invention.
Figure 16:
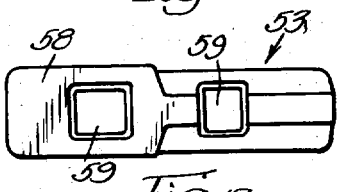
FIGURE 16 is a view, in rear elevation, of a journal guide that can be employed in conjunction with the journal guide housing shown in FIGURES 13, 14 and 15.
Figure 14:
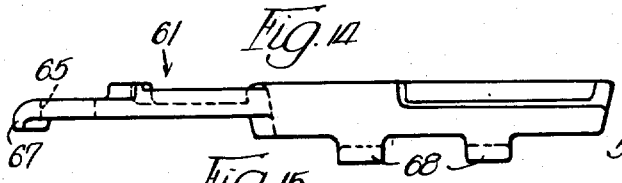
FIGURE 14 is a top plan view of the journal guide housing shown in FIGURE 13.
Figure 17:
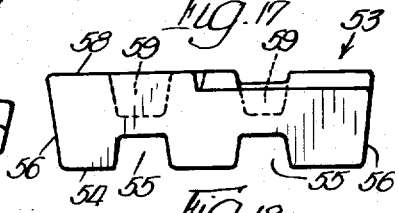
FIGURE 17 is a top plan view of the journal guide shown in FIGURE 16.
Figure 15:
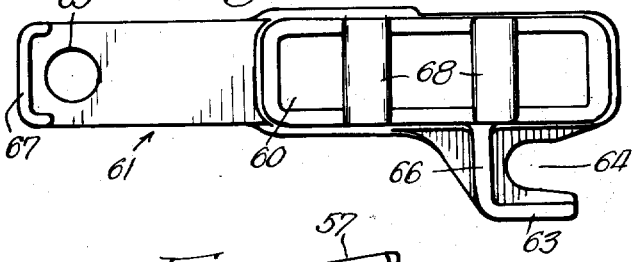
FIGURE 15 is a view, in front elevation, of the journal guide housing shown in FIGURES 13 and 14.
Figure 18:
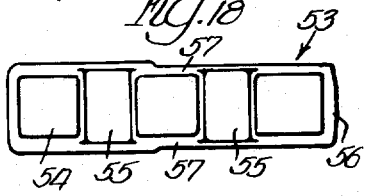
FIGURE 18 is a view, in front elevation, of the journal guide shown in FIGURES 16 and 17.
Figure 19:
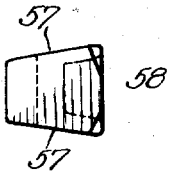
FIGURE 19 is a view, in end elevation, of the journal guide shown in FIGURES 16, 17 and 18.

In describing the application of the journal guides 53 it will be assumed that the axle journal 11 is positioned within the journal box 14 as shown in FIGURES 10, 11 and 12. Also, it will be assumed that the journal bearing 21 and wedge 22 have been removed. The bolts 40 are inserted in the openings 43 in the side walls 17 and 18 and the nuts 42 are loosely threaded thereon. Next a journal guide 53 assembled in a journal guide housing 61 is inserted endwise into the journal box 14 above the end collar 12. The left end of the journal guide 53 or the inclined end 56 adjacent thereto is moved in close proximity therewith downwardly over the surface of the axle journal 11. This permits the bifurcated section 63 to clear the respective bolt 40. When the journal guide 53 has been located properly, it and the journal guide housing 62 are moved endwise past the bolt 40 so that it extends through the respective slot 64. Then the bolts 44 are inserted and all of the nuts 42 and 48 are tightened to hold the journal guide 53 securely in position.

While reliance can be placed solely on the mortise and tenon joint between the journal guide 53 and the journal guide housing 61 for holding the former in place in the latter, additional holding means can be provided by bridging portions 68 which are formed integrally with the side walls of the socket 60 and extend thereacross and interfit with the vertical grooves 55 in the bearing face 54.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal, an elongated journal guide housing on the inner side of each side wall in horizontal aligned relation with the axis of rotation of said axle journal and spaced from the diametrically opposite sides of said axle journal, each journal guide housing having a bifurcated section at its inner end for endwise application to said one bolt of each pair and an aperture at its outer end for receiving therethrough the other bolt of each pair, each journal guide housing also having a journal guide receiving socket, and a journal guide in each socket with a bearing face on one side juxtaposed to said diametrically opposite sides of said axle journal and the other side bearing against the inner side of the respective vertical wall, each journal guide being held in operative position by its journal guide housing when said nuts on the respective bolts are tightened.

2. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal, an elongated journal guide housing on the inner side of each side wall in horizontal aligned relation with the axis of rotation of said axle journal and spaced from the diametrically opposite sides of said axle journal, each journal guide housing having a bifurcated section at its inner end for endwise application to said one bolt of each pair and an aperture at its outer end for receiving therethrough the other bolt of each pair, each journal guide housing also having a journal guide receiving socket, and a journal guide in each socket with a vertically grooved bearing face on one side juxtaposed to said diametrically opposite sides of said axle journal and the other side bearing against the inner side of the respective vertical wall, each journal guide being held in operative position by its journal guide housing when said nuts on the respective bolts are tightened.

3. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal, an elongated journal guide housing on the inner side of each side wall in horizontal aligned relation with the axis of rotation of said axle journal and spaced from the diametrically opposite sides of said axle journal, each journal guide housing having a bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

4. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal, an elongated ferrous metal journal guide housing on the inner side of each side wall in horizontal aligned relation with the axis of rotation of said axle journal and spaced from the diametrically opposite sides of said axle journal, each journal guide housing having a bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a non-ferrous metal journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

5. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal and all of said bolts being located in a horizontal plane through the axis of rotation of said axle journal, an elongated journal guide housing on the inner side of each side wall in horizontal aligned relation with said axis of rotation of said axle journal and spaced from the diametrically opposite sides of said axle journal, each journal guide housing having a longitudinally extending bifurcated section at its inner end for endwise application to said one bolt of each pair and an aperture at its outer end for receiving therethrough the other bolt of each pair, each journal guide housing also having a journal guide receiving socket, and a journal guide in each socket with a bearing face on one side juxtaposed to said diametrically opposite sides of said axle journal and the other side bearing against the inner side of the respective vertical wall, each journal guide being held in operative position by its journal guide housing when said nuts on the respective bolts are tightened.

6. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal and all of said bolts being located in a horizontal plane through the axis of rotation of said axle journal, an elongated journal guide housing on the inner side of each side wall in horizontal aligned relation with said axis of rotation of said axle journal and spaced from the diametrically opposite sides of said axle journal, each journal guide housing having a longitudinally extending bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

7. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and the other bolt being located beyond the outer end of said axle journal and all of said bolts being located in a horizontal plane through the axis of rotation of said axle journal, an elongated ferrous metal journal guide housing on the inner side of each side wall in horizontal aligned relation with said axis of rotation of said axle journal and spaced from the diametrically opposite sides of said axle journal, each journal guide housing having a longitudinally extending bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a non-ferrous metal journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

8. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and below the horizontal plane through the axis of rotation of said axle journal and the other bolt being located beyond the outer end of said axle journal in said horizontal plane, an elongated journal guide housing on the inner side of each side wall in horizontal aligned relation with said axis of rotation of said axle journal and spaced from the diametrically opposite sides of said axle journal, each journal guide housing having below its longitudinal axis a bifurcated section at its inner end for endwise application to said one bolt of each pair and an aperture at its outer end for receiving therethrough the other bolt of each pair, each journal guide housing also having a journal guide receiving socket, and a journal guide in each socket with a bearing face on one side juxtaposed to said diametrically opposite sides of said axle journal and the other side bearing against the inner side of the respective vertical wall, each journal guide being held in operative position by its journal guide housing when said nuts on the respective bolts are tightened.

9. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and below the horizontal plane through the axis of rotation of said axle journal and the other bolt being located beyond the outer end of said axle journal in said horizontal plane, an elongated journal guide housing on the inner side of each side wall in horizontal aligned relation with said axis of rotation of said axle journal and spaced from the diametrically opposite sides of said axle journal, each journal guide housing having below its longitudinal axis a bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

10. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and below the horizontal plane through the axis of rotation of said axle journal and the other bolt being located beyond the outer end of said axle journal in said horizontal plane, an elongated journal guide housing on the inner side of each side wall in horizontal aligned relation with said axis of rotation of said axle journal and spaced from the diametrically opposite sides of said axle journal and spaced from the diametrically opposite sides of said axle journal, each journal guide housing having below its longitudinal axis a bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, a journal guide in the form of an out flaring tenon in each socket with a vertically grooved bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened, and bridging means on each journal guide housing between opposite sides of said socket interfitting with the grooves in said bearing faces.

11. In combination, a railway car journal box having spaced vertical side walls and an axle journal spaced from said side walls, a pair of threaded bolts extending through each side wall with heads on the inside of each side wall and nuts on the outside thereof, one bolt of each pair being located intermediate the ends of said axle journal and below the horizontal plane through the axis of rotation of said axle journal and the other bolt being located beyond the outer end of said axle journal in said horizontal plane, an elongated ferrous metal journal guide housing on the inner side of each side wall in horizontal aligned relation with said axis of rotation of said axle journal and spaced from the diametrically opposite sides of said axle journal, each journal guide housing having below its longitudinal axis a bifurcated section at its inner end for endwise application to said one bolt of each pair and an aperture at its outer end for receiving therethrough the other bolt of each pair, each journal guide housing also having a journal guide receiving socket in the form of a mortise flaring toward the respective side wall, and a non-ferrous metal journal guide in the form of an out flaring tenon in each socket with a bearing face on one side juxtaposed to said diametrically opposite sides of said axle journal and the other side bearing against the inner side of the respective vertical wall, each journal guide being wedgingly held in operative position by its journal guide housing when said nuts on the respective bolts are tightened.

*12. In combination, a railway car journal box having spaced vertical side walls and an axle journal spaced from said side walls, inner and outer holding means on each side wall, said inner holding means being located intermediate the ends of said axle journal and said outer holding means being located outwardly thereof, an elongated journal guide housing on the inner side of each side wall in horizontal aligned relation with the axis of rotation of said axle journal and spaced from the diametrically opposite sides of said axle journal, each journal guide housing having a section at its inner end for endwise application to and holding by the respective inner holding means and a section at its outer end engaging with and held by the respective outer holding means, each journal guide also having a journal guide receiving socket, and a journal guide in each socket with a bearing face on one side juxtaposed to said diametrically opposite sides of said axle journal and the other side reacting against the inner side of the respective wall, each journal guide being held in operative position with respect to said axle journal and urged toward the respective side wall by its journal guide housing when the inner and outer sections thereof are held by the respective inner and outer holding means.*

*13. In combination, a railway car journal box having spaced vertical side walls and an axle journal spaced from said side walls, inner and outer holding means on each side wall, said inner holding means being located intermediate the ends of said axle journal and said outer holding means being located beyond the outer end of said axle journal, an elongated journal guide housing on the inner side of each side wall in horizontal aligned relation with the axis of rotation of said axle journal and spaced from the diametrically opposite sides of said axle journal, each journal guide housing having a section at its inner end for endwise application to and holding by the respective inner holding means and a section at its outer end engaging with and held by the respective outer holding means, each journal guide also having a journal guide receiving socket in the form of a mortise flaring toward the respective side wall, and a journal guide in the form of an out flaring tenon in each socket with a bearing face on one side juxtaposed to said diametrically opposite sides of said axle journal and the other side reacting against the inner side of the respective wall, each journal guide being wedgingly held in operative position with respect to said axle journal and urged toward the respective side wall by its journal guide housing when the inner and outer sections thereof are held by the respective inner and outer holding means.*

*14. In combination, a railway car journal box having spaced vertical side walls and an axle journal spaced from said side walls, inner and outer holding means on each side wall, said inner holding means being located intermediate the ends of said axle journal and said outer holding means being located beyond the outer end of said axle journal and both said holding means being located in a horizontal plane through the axis of rotation of said axle journal, an elongated journal guide housing on the inner side of each side wall in horizontal aligned relation with the axis of rotation of said axle journal and spaced from the diametrically opposite sides of said axle journal, each journal guide housing having a section at its inner end for endwise application to and holding by the respective inner holding means and a section at its outer end engaging with and held by the respective outer holding means, each journal guide also having a journal guide receiving socket, and a journal guide in each socket with a bearing face on one side juxtaposed to said diametrically opposite sides of said axle journal and the other side reacting against the inner side of the respective wall, each journal guide being held in operative position with respect to said axle journal and urged toward the respective side wall by its journal guide housing when the inner and outer sections thereof are held by the respective inner and outer holding means.*

*15. In combination, a railway car journal box having vertical side walls and an axle journal spaced from said side walls, inner and outer holding means on each side wall, said inner holding means being located intermediate the ends of said axle journal at a lower elevation than said other holding means and said outer holding means being located beyond the outer end of said axle journal, an elongated journal guide housing on the inner side of each side wall in horizontal aligned relation with the axis of rotation of said axle journal and spaced from the diametrically opposite sides of said axle journal, each journal guide housing having a section at its inner end for endwise application to and holding by the respective inner holding means and a section at its outer end engaging with and held by the respective outer holding means, each journal guide also having a journal guide receiving socket, and a journal guide in each socket with a bearing face on one side juxtaposed to said diametrically opposite sides of said axle journal and the other side reacting against the inner side of the respective wall, each journal guide being held in operative position with respect to said axle journal and urged toward the respective side wall by its journal guide housing when the inner and outer sections thereof are held by the respective inner and outer holding means.*

References Cited in the file of this patent or the original patent

UNITED STATES PATENTS

| | | |
|---|---|---|
| 1,941,486 | Pilcher | Jan. 2, 1934 |
| 2,733,966 | Ryan | Feb. 7, 1956 |